Oct. 17, 1967   R. D. HANNA   3,347,970
METHOD OF FORMING DUPLICATE BOTTLES BY HEAT SHRINKING
Filed Aug. 19, 1964
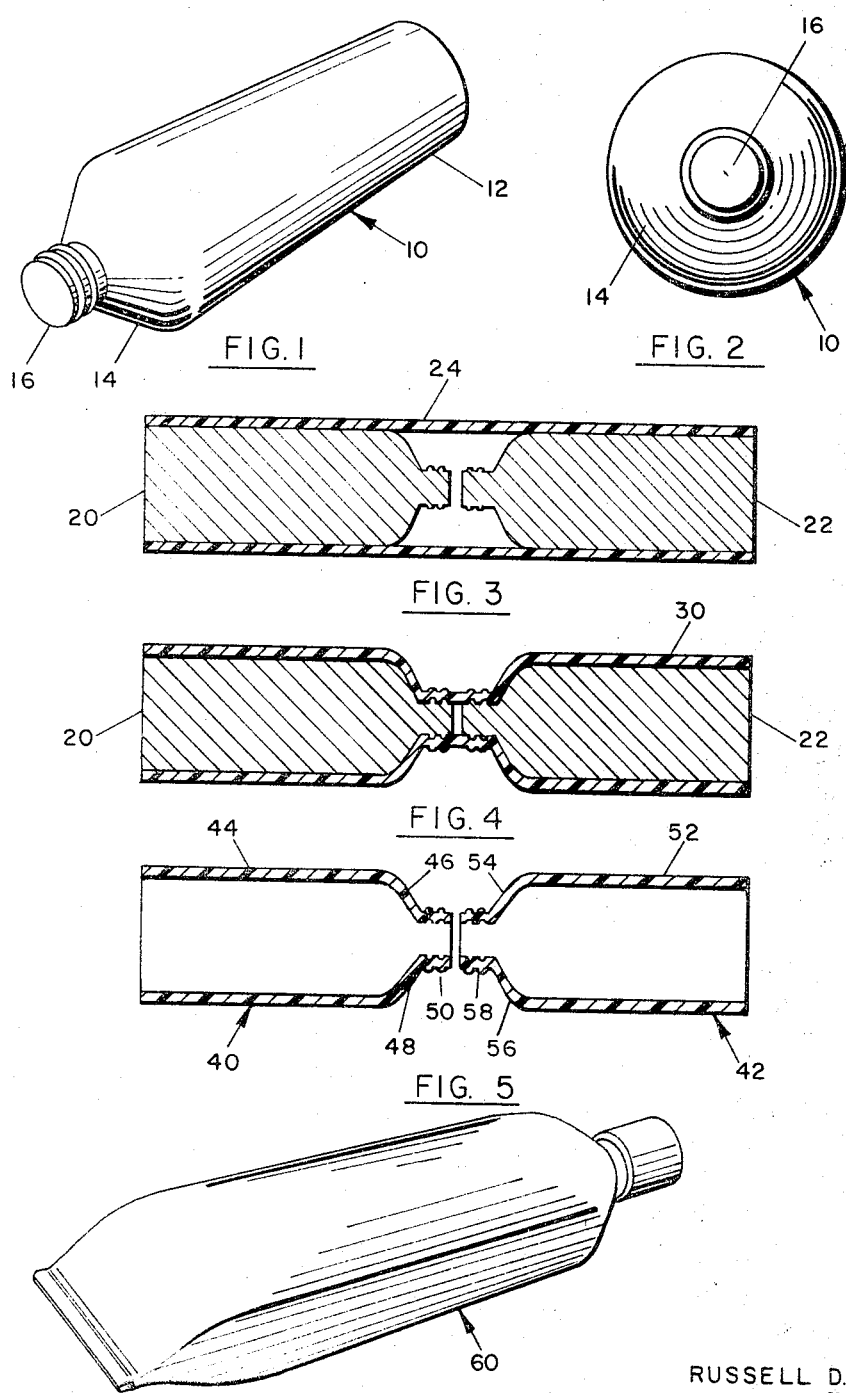
RUSSELL D. HANNA
INVENTOR.
BY Ernest G. Peterson
AGENT United States Patent Office 3,347,970
Patented Oct. 17, 1967

3,347,970
METHOD OF FORMING DUPLICATE BOTTLES BY HEAT SHRINKING
Russell D. Hanna, Hockessin, Del., assignor to Hercules Incorporated, Wilmington, Del., a corporation of Delaware
Filed Aug. 19, 1964, Ser. No. 390,523
2 Claims. (Cl. 264—230)

This invention relates to the packaging art. Particularly, this invention relates to plastic squeeze tubes and to a novel method for their manufacture.

More particularly, this invention relates to the manufacture of plastic squeeze tubes from circumferentially oriented plastic tubing which is capable of shrinking upon the application of heat.

Plastic squeeze tubes, sometimes referred to as "squeeze-to-use" tubes, have gained wide acceptance as a means for packaging such diverse products as cosmetics, pharmaceuticals, household chemicals, petroleum products, and industrial chemicals. They offer the consumer both protection and long shelf life for the packaged product. They keep the packaged product fresh and pure until entirely used, and dispense the product in the amount desired.

This invention is directed to a novel method for the manufacture of plastic squeeze tubes and to the plastic squeeze tubes thus produced.

For a complete understanding of this invention, reference is made to the following detailed description and drawing, in which:

FIG. 1 is a view in perspective of a mandrel;
FIG. 2 is an end view of the mandrel of FIG. 1;
FIG. 3 is a longitudinal cross-sectional view of circumferentially oriented plastic tubing supported on two axially aligned mandrels;
FIG. 4 is a longitudinal cross-sectional view of the plastic tubing and mandrels after the tubing has been shrunk;
FIG. 5 is a longitudinal cross-sectional view of a shaped tube separated into two squeeze tubes; and
FIG. 6 is a view in perspective of a capped, filled, and sealed plastic squeeze tube.

Broadly, in accordance with this invention, circumferentially oriented plastic tubing, a portion of which is supported internally by a suitably shaped mandrel, is subjected to heat whereby the internally unsupported portion thereof shrinks about and in conformity with a portion of the mandrel to provide a shaped tube which, after removal of the mandrel, can be employed as a plastic squeeze tube simply by capping, filling, and end sealing.

Circumferentially oriented plastic tubing is known in the art. Circumferential orientation of plastic tubing is usually accomplished by expanding extruded tubing, usually substantially immediately after extrusion, under controlled temperature conditions to produce optimum orientation. One method of making circumferentially oriented tubing is disclosed and described in U.S. Patent No. 2,821,155.

Circumferentially oriented tubing can be prepared from certain thermoplastic resins such as the polyolefins such, for example, as polyethylene and polypropylene; the polyesters such as poly(ethylene terephthalate); the vinyl polymers and copolymers such as poly(vinyl chloride), poly(vinyl dichloride), poly(vinylidene chloride), and the copolymer of vinyl chloride and vinyl acetate; polystyrene; and the like. The tubing used will be of suitable dimensions to provide a squeeze tube of desired shape and of desired strength properties. The wall thickness of the tubing can vary but usually will be of the order of from about 15 mils to 50 mils. The inner diameter of the tubing will usually be of the order of from about ½ inch to 2 inches. Tubing of smaller or larger inner diameters can be used if desired.

Referring to FIG. 1 and FIG. 2 of the drawing, there is shown mandrel 10 which is used to prepare squeeze tubes in accordance with this invention. The mandrel 10 is comprised of an elongated, cylindrical body portion 12 of substantially uniform cross-sectional diameter, a shoulder portion 14 which can be of any desired shape, but preferably is in conical form as illustrated, and a screw-threaded cylindrical neck portion 16 which has a cross-sectional diameter less than that of body portion 12.

The mandrel employed in this invention can be prepared from any dimensionally stable material that will not be affected adversely by the heat required to shrink the circumferentially oriented plastic tubing employed. Thus, the mandrel can be prepared from such materials as wood; glass; metal, such as stainless steel and aluminum; thermoset resins such as the phenolic resins; and thermoplastic resins such as polytetrafluoroethylene. The surface of the mandrel can have applied thereto, if desired, to facilitate separation of the mandrel and the shaped tubing, a mold release agent such, for example, as the known silicone-type mold release agents. Metal mandrels can be sandblasted to provide thereon a matte surface which will prevent excessive adhesion of the shaped tubing. The mandrel can be either solid or hollow, and can be provided with suitable internal cooling means if desired.

In carrying out this invention, it is preferred to use two co-acting, axially aligned mandrels to prepare a shaped tube which can be subsequently divided into two squeeze tubes. As shown in FIG. 3 of the drawing, two mandrels, 20 and 22, are placed neck-to-neck and maintained in axial alignment by suitable means such as an aligning pin, not shown, so as to have the tip of the screw-threaded neck portion of one mandrel adjacent the tip of the screw-threaded neck portion of the other mandrel. The tips of the screw-threaded neck portions can be maintained in abutting relationship, if desired, or they can be spaced slightly apart, as shown. The mandrels, 20 and 22, support internally on their respective body portions, circumferentially oriented plastic tubing 24. The inner diameter of tubing 24 will be at least that of the cross-sectional diameter of the body portions of the mandrels and preferably slightly larger so that it can be easily and readily placed in position on the mandrels. As will be noted, the tubing is unsupported internally in that area where it surrounds the respective shoulder and neck portions of the mandrels, 20 and 22.

After the tubing 24 has been positioned on mandrels 20 and 22, the unsupported portion of the tubing is heated to cause disorientation and shrinking of the tubing into conformity with the respective shoulder and screw-threaded neck portions of the mandrels 20 and 22 as shown in FIG. 4 of the drawing to provide shaped tube 30.

Heating of tubing 24 can be accomplished by immersing the assembly shown in FIG. 3 into a bath of heated mercury, diethylene glycol, mineral oil, or other suitable liquid that will not boil or evaporate excessively at tubing-shrinking temperatures. Alternatively, shrinking of the tubing can be achieved by open gas flames converging at the unsupported central portion of tubing 24 through which the assembly is passed, or by an electric heating coil spaced about the central portion of the asembly. An effective method for heating the central, unsupported portion of tubing 24 is by directing thereover a stream of hot air or steam until the required shrinking has taken place. It is recommended that the tubing be heated uniformly to avoid distortion of or wrinkles in the shaped tube 30, and the mandrels and tubing can be rotated, if desired, to facilitate uniform heating. The exact temperature to which the unsupported portion of tubing 24 is heated will depend on the properties of the resin or polymeric material from which it is formed. The determination of a suitable temperature is within the skill of those versed in the art.

The shaped tube 30 is subsequently cooled to room temperature, preferably while still in position on mandrels 20 and and 22. After cooling, the shaped tube 30 is removed from the mandrels. This is easily and readily accomplished by rotating each mandrel by suitable means, not shown, in a direction opposite to the lead of the screw threads of the respective neck portions of the mandrels, while simultaneously exerting a force in the direction of withdrawal. For ease of removal, rotation of the mandrels is preferably continued until they are completely removed from the shaped tube 30.

As shown in FIG. 5, the shaped tube 30 is subsequently divided into two squeeze tubes 40 and 42 by cutting with a knife, circular saw, or the like, the shaped tube 30 at about the linear center thereof. Another highly satisfactory method of dividing shaped tube 30 is by passing a heated wire through the linear center thereof. When the mandrels are spaced apart as shown in FIG. 4 of the drawing, the shaped tube can be divided while it is still in position on the mandrels simply by passing a severing means through the tube and through the space between the mandrel tips.

The squeeze tube 40 is comprised of an elongated, tubular body portion 44, and integral therewith a dispenser end 46 comprised of a shoulder portion 48 and an apertured screw-threaded nozzle 50. Similarly, squeeze tube 42 is comprised of an elongated tubular body portion 52, and a dispenser end 54 comprised of shoulder portion 56 and an apertured screw-threaded nozzle 58.

The squeeze tube is capped by applying to the screw-threaded nozzle a screw-threaded cap that can be prepared from any suitable material such as a thermoset resin such, for example, as a phenolic resin or a urea-formaldehyde resin. Satisfactory caps can be prepared also from thermoplastic resins such as polyethylene and polypropylene. Threaded caps can be prepared by any suitable method such as by injection-molding. The elongated tubular body portion of the capped squeeze tube is then filled from the open end thereof with the product to be packaged. After filling, the open end is sealed shut to provide a capped, filled, and sealed squeeze tube 60. Sealing of the filling end can be accomplished by heat sealing means or by the use of an ultrasonic sealing head. Other suitable sealing means can be employed if desired, such, for example, as a crimped metal end closure.

In the above-described preferred embodiment of this invention, two tubes are prepared in one shaped operation. It will be understood that a single tube can be prepared in a single shaping operation, if desired, by employing a single mandrel. Thus, circumferentially oriented plastic tubing of suitable dimensions is placed on a single mandrel similar to mandrel 10 whereby a portion of the tubing is supported internally by the body portion of the mandrel and a portion thereof is unsupported internally. The unsupported portion of the tubing is heated and shrunk about and in conformity with the shoulder and screw-threaded cylindrical neck portions of the mandrel. After cooling, the mandrel is removed in the manner above described.

The circumferentially oriented tubing of this invention can be prepared from pigmented resin to provide desired color effects. In addition, the tubing can, after surface preparations, if required, be imprinted with various designs, identifying indicia, and the like, prior to shaping. If desired, the necessary printing and the like can be accomplished after the squeeze tube has been formed, while still on the mandrel or mandrels or after removal therefrom, or even after it has been capped, filled, and end sealed.

It is to be understood that the above description and drawing are illustrative of this invention and not in limitation thereof. For example, one skilled in the art can easily devise a method and apparatus for continuous or semi-continuous operation of the process of the invention.

What I claim and desire to protect by Letter Patent is:

1. A process for the manufacture of plastic squeeze tubes which comprises providing a pair of mandrels each having a cylindrical body portion of substantially uniform diameter, an externally threaded neck portion of a diameter less than the diameter of the body portion, and a shoulder portion intermediate said body and neck portions, said pair of mandrels being arranged in axially aligned relation with the neck portions thereof opposed, placing onto said mandrels a tube of circumferentially oriented plastic material having an internal diameter slightly larger than the diameter of the body portion of said mandrels whereby said tube conforms closely to the periphery of said mandrels in that portion of the tube that surrounds said body portion and is spaced from said mandrels in that portion of the tube that surrounds said neck and shoulder portions, heating said tube to shrink the same against the mandrels and thereby to shape the same into a pair of squeeze tubes having elongated body portions surrounding the body portions of said mandrels and having dispenser portions integral with the body portions at the inner ends thereof and surrounding the neck and shoulder portions of the mandrels and including apertured externally-threaded nozzles, removing said mandrels from said squeeze tubes after cooling the tubes below the shrink temperature, and severing said tube in a plane normal to the axis thereof and between the opposed ends of the dispenser portions.

2. A process in accordance with claim 1 for the manufacture of plastic squeeze tubes in which the heating of said tube is substantially localized to that portion of the tube that surrounds said neck and shoulder portions.

References Cited

UNITED STATES PATENTS

| | | |
|---|---|---|
| 2,396,635 | 3/1946 | Bogoslowsky. |
| 2,411,244 | 11/1946 | Bogoslowsky. |
| 2,989,785 | 6/1961 | Stahl _____ 264—230 |
| 3,133,387 | 5/1964 | Harrison. |

FOREIGN PATENTS

| | | |
|---|---|---|
| 8319/61 | 6/1958 | Japan. |

ROY B. MOFFITT, *Primary Examiner.*